United States Patent [19]
Chavez

[11] Patent Number: 5,897,793
[45] Date of Patent: Apr. 27, 1999

[54] METHODS AND APPARATUS FOR MACHINING A PIPE IN A NUCLEAR REACTOR

[75] Inventor: Bryan K. Chavez, San Jose, Calif.

[73] Assignee: General Electric Company, Schenectady, N.Y.

[21] Appl. No.: 08/805,103

[22] Filed: Feb. 24, 1997

[51] Int. Cl.$^6$ ............................. B23H 1/00; B23H 7/30
[52] U.S. Cl. ........................ 219/69.2; 219/69.17; 376/260
[58] Field of Search ............................. 219/69.2, 69.17, 219/68; 376/260

[56] References Cited

U.S. PATENT DOCUMENTS

| | | | |
|---|---|---|---|
| 2,263,412 | 11/1941 | Armentrout | 219/69.17 |
| 4,162,383 | 7/1979 | Hamasaki | 219/68 |
| 4,948,933 | 8/1990 | Thompson | 219/69.2 |
| 5,324,907 | 6/1994 | Wallace | 219/69.2 |
| 5,543,599 | 8/1996 | Cole et al. | 219/69.2 |
| 5,569,393 | 10/1996 | Reinhart et al. | 219/69.17 |

*Primary Examiner*—Geoffrey S. Evans
*Attorney, Agent, or Firm*—Armstrong & Teasdale LLP

[57] ABSTRACT

Methods and apparatus for machining a pipe in a reactor pressure vessel (RPV) of a nuclear reactor are described. In one embodiment of the apparatus, a EDM tool facilitates machining an opening in a pipe from within the bore of the pipe. More particularly, and in accordance with one embodiment of the present invention, the EDM tool includes a housing, a linear motion guide, a cam, and an electrode. The housing is sized to fit within the pipe bore and includes a first end and a second end, and an electrode bore extends longitudinally through the housing and is sized to receive the electrode. The cam is slidably coupled to the housing so that the cam moves between the respective housing first and second ends. The electrode is positioned within the electrode bore of the housing and is coupled to the cam so that the electrode may move relative to the electrode bore. The linear motion guide drives the cam so that the cam moves between the housing first and second ends, and so that the electrode extends and retracts from the housing electrode bore.

17 Claims, 4 Drawing Sheets

METHODS AND APPARATUS FOR MACHINING A PIPE IN A NUCLEAR REACTOR

FIELD OF THE INVENTION

This invention relates generally to nuclear reactors and, more particularly, to methods and apparatus for machining pipes within a nuclear reactor pressure vessel.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds the both the core plate and the top guide. The top guide includes several openings, and fuel bundles are inserted through the openings and are supported by the core plate.

A plurality of openings are formed in the bottom head so that components, such as in core monitor assemblies and control rod drive assemblies, can extend within the RPV. Typically, a substantially cylindrical stub tube, or guide tube, having a bore extending therethrough is welded to the bottom head and the tube bore aligns with an opening in the bottom head. The cylindrical stub tube typically is fabricated from a corrosion resistant material such as stainless steel or Ni—Cr—Fe.

With an in core monitor assembly, for example, the in core monitor housing, e.g., a tube, is inserted through the bottom head opening and stub tube bore, and the housing extends into the RPV. The in core monitor housing (ICMH) is welded to the stub tube to maintain the housing in the desired position. The stub tube thus serves as a transition piece between the bottom head dome, which typically is fabricated from low alloy steel, and the CRD housing, which typically is fabricated from stainless steel.

When performing maintenance or repairs in an RPV, it often is desirable to acquire electrochemical corrosion potential (ECP) measurements for RPV components such as pipes and in core monitor housings. To obtain ECP measurements for an in core monitor housing, for example, it is desirable to machine an opening in the in core monitor housing (ICMH) sidewall. One known method of machining an opening in the ICMH requires positioning a machining tool, i.e., an electrical discharge machine, adjacent an exterior surface of the sidewall, and activating the apparatus to machine an opening through the ICMH sidewall. This approach, however, is time consuming and often impractical. Particularly, depending on the size and location of the ICMH or pipe to be machined, it often is difficult to position the tool adjacent the exterior surface of the ICMH or pipe.

Accordingly, it would be desirable to provide an apparatus for machining pipes and valves in a nuclear reactor more easily than by known methods. It also would be desirable to provide such an apparatus which is inexpensive and easy to operate.

SUMMARY OF THE INVENTION

These and other objects are attained by an apparatus which, in one embodiment, includes an electrical discharge machining (EDM) tool for machining an opening in a pipe or ICMH from within the pipe or ICMH. The present tool is configured to be positioned within the pipe, for example, and machines an opening in the pipe starting at an internal surface of the sidewall rather than at an external surface. By being positioned in the pipe, the present tool may be utilized even where access to the external surface of the pipe is inhibited.

More particularly, and in accordance with one embodiment of the present invention, the EDM tool includes a housing, a cam, a linear motion guide, and an electrode. The housing includes a first end and a second end, and an electrode bore extends longitudinally through the housing and is sized to receive the electrode. The cam is slidably coupled to the housing so that the cam may move between the respective housing first and second ends. The electrode is positioned within the electrode bore of the housing and is coupled to the cam so that the electrode moves relative to the electrode bore. Particularly, when the cam moves in a first direction, the electrode moves outward relative to the housing, and when the cam moves in a second direction, the electrode is retracted within the housing electrode bore.

In operation, the tool is positioned within a pipe bore of the pipe to be machined so that the housing extends substantially coaxially within the pipe and so that the center axis of the electrode is substantially perpendicular to the center axis of the pipe. Once the tool is positioned at the desired location within the pipe, the linear motion guide drives the cam so that the cam moves in the first direction. Power also is supplied to the electrode, and when the electrode abuts the inner pipe bore surface, an opening is machined in the pipe.

By using the above described cam assembly, pipes and valves in a nuclear reactor may be machined more easily than by known methods. Such assembly also is inexpensive and easy to operate.

DETAILED DESCRIPTION OF THE DRAWINGS

Figure 1:
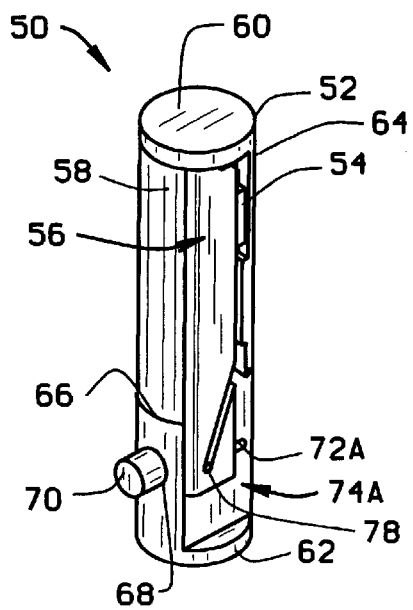
FIG. 1 is a perspective schematic illustration of an EDM tool in accordance with one embodiment of the present invention.

FIG. 1 is a perspective schematic illustration of an EDM tool 50 in accordance with one embodiment of the present invention. EDM tool 50 includes a housing 52, a linear motion guide 54, a cam 56, and a housing support member 58. Housing 52 has a substantially cylindrical shape and includes a substantially circular first end 60 and a substantially circular second end 62. A first wall 64 extends between first end 60 and second end 62 so that first end 60 and second end 62 extend substantially perpendicularly from first wall 64 and define a cavity 66 between first end 60 and second end 62. Linear motion guide 54 and cam 56 are positioned in housing cavity 66, and support member 58 is coupled to housing 52 opposite first wall 64 so that linear motion guide 54 and cam 56 are positioned between support member 58 and first wall 64.

Housing 52 also includes an electrode bore 68 adjacent housing second end 62. Electrode bore 68 extends substantially perpendicular to a central axis (not shown) of substantially cylindrical housing 52, i.e., electrode bore 68 extends substantially transversely through housing 52, and is sized to receive an electrode 70 (in dotted lines). Housing 52 further includes a first pin slot 72A and a second pin slot 72B (only first pin slot 72A is shown in FIG. 1). First and second pin slots 72A and 72B are located on opposite sides 74A and 74B (only side 74A is shown in FIG. 1) of electrode bore 68, and each pin slot 72A and 72B extends substantially parallel to and in communication with electrode bore 68. In addition, pin slots 72A and 72B are substantially aligned.

Electrode 70 is substantially cylindrical and an electrode pin bore 76 (not shown in FIG. 1) extends substantially transversely through electrode 70. Electrode 70 is positioned in electrode bore 68 so that electrode pin bore 76 extends between and is substantially aligned with first and second pin slots 72A and 72B. An electrode pin 78 extends through electrode pin bore 76 and first and second pin slots 72A and 72B to movably couple electrode 70 to housing 52.

Figure 2:
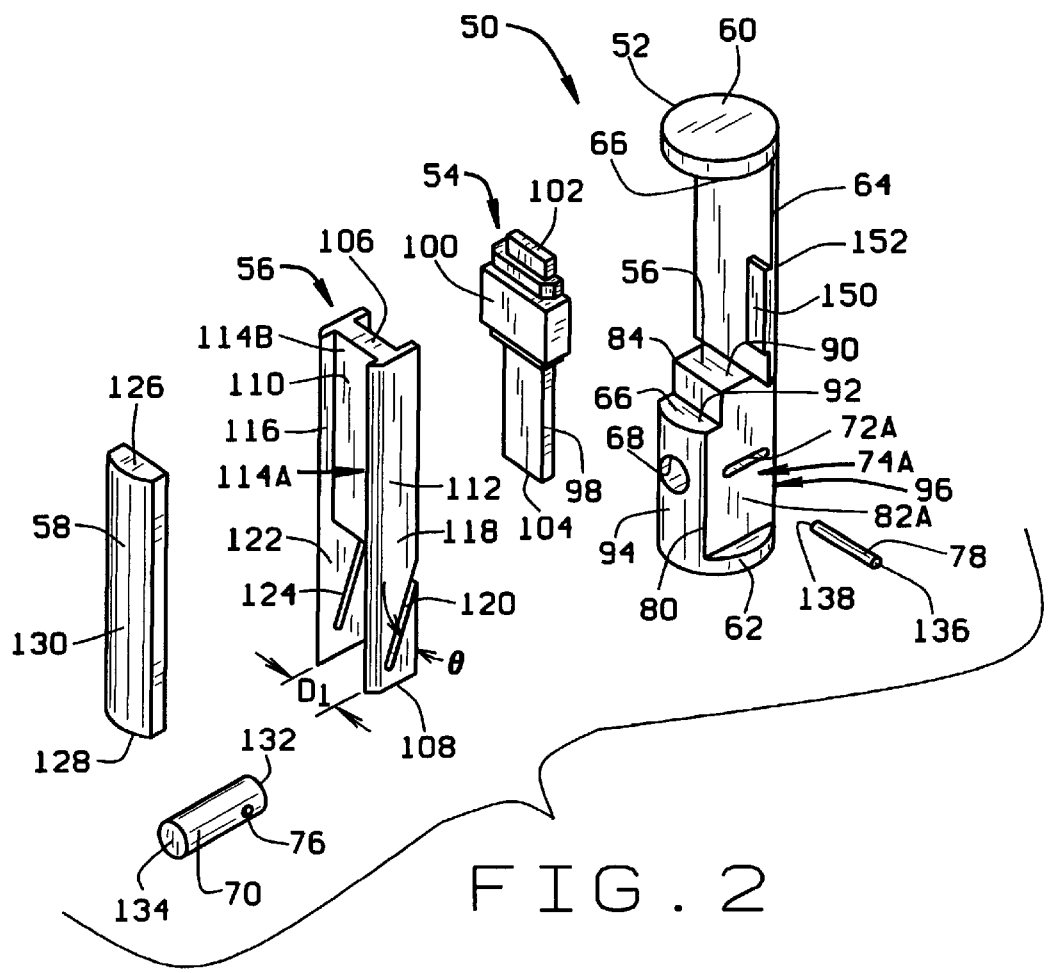
FIG. 2 is an exploded perspective schematic illustration of the EDM tool shown in FIG. 1.

FIG. 2 is an exploded perspective schematic illustration of EDM tool 50. As shown more clearly, housing 52 includes a lower portion 80 extending from housing second end 62 between second end 62 and first end 60. Lower portion 80 includes two side walls 82A and 82B (only side wall 82A is shown in FIG. 2). An upper end 84 of lower portion 80 includes a linear motion guide surface 86 which is displaced from a support member surface 88. However, linear motion guide surface 86 may be substantially co-planar with support member surface 88. Linear motion guide surface 86 and first end 60 of housing 52 define a linear motion guide portion 90 of housing cavity 66 sized to receive linear motion guide 54. Similarly, support member surface 88 and first end 60 of housing 52 define a support member portion 92 of housing cavity 66 sized to receive support member 58.

Electrode bore 68 extends between a first side 94 and a second side 96 of housing lower portion 80 so that electrode bore 68 is substantially transverse to housing 52. Sidewall 82A of lower portion 80 includes first pin slot 72A which is in communication with electrode bore 68 and sidewall 82B of lower portion 80 includes second pin slot 72B which also is in communication with electrode bore 68. First and second pin slots 72A and 72B each are sized to receive at least a portion of electrode pin 78.

Linear motion guide 54 includes a support rail 98 and a movable bearing 100. Support rail 98 includes a first end 102 and a second end 104, and bearing 100 is coupled to support rail 98 so that bearing is movable between first and second ends 102 and 104, respectively, of support rail 98. Bearing 100 also is configured to couple to cam 56. Bearing 100 may, for example, be a linear bearing. Linear motion guides are well known and commercially available.

Cam 56 includes a first end 106, a second end 108, and a central portion 110 extending between first end 106 and second end 108. A first cam leg 112 extends between first end 106 and second end 108 adjacent one side 114A of central portion 110, and a second cam leg 116 extends between first end 106 and second end 108 adjacent the other side 114B of central portion 110. First cam leg 112 is substantially parallel to second cam leg 116, and cam legs 112 and 116 are spaced a distance $D_1$ apart so that cam legs 112 and 116 may straddle lower portion 80 of housing 52, i.e., so that lower portion 80 may be received between cam legs 112 and 116. First cam leg 112 includes a lower portion 118 having a first slot 120. Similarly, second cam leg 116 includes a lower portion 122 having a second slot 124. First and second slots 120 and 124 are substantially parallel and are inclined, i.e., angled, at an angle theta relative to respective cam legs 112 and 116. First and second slots 120 and 124 may, for example, be oriented at an angle theta of thirty degrees relative to respective cam legs 112 and 116. Each slot 120 and 124 is sized to receive at least a portion of electrode pin 78.

Support member 58 includes a first end 126 and a second end 128. Support member 58 further includes an outer surface 130 which is substantially curved. In accordance with one embodiment, outer surface 130 has a radius of curvature substantially the same as a radius of curvature of housing 52.

Electrode 70 is substantially cylindrical and includes a first end 132 and a second end 134. Electrode pin bore 76 extends substantially transversely through electrode 70 adjacent first end 132 and, as described above, is sized to receive electrode pin 78. Electrode pin 78, as shown in FIG. 2, includes a first end 136 and a second end 138, and is sized to extend through electrode pin bore 76, housing pin slots 72A and 72B and cam slots 120 and 124.

Figure 3:
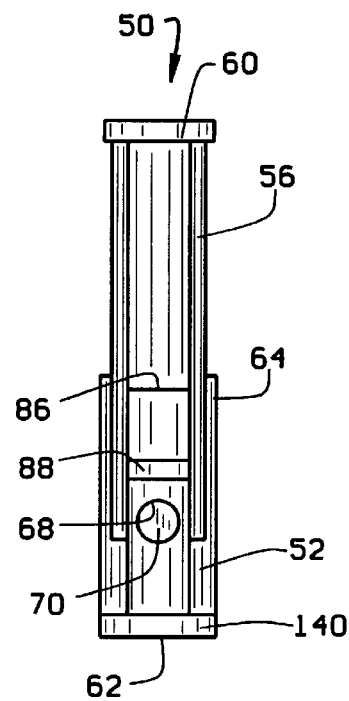
FIG. 3 is a front view schematic illustration of the EDM tool shown in FIG. 1.
Figure 4:
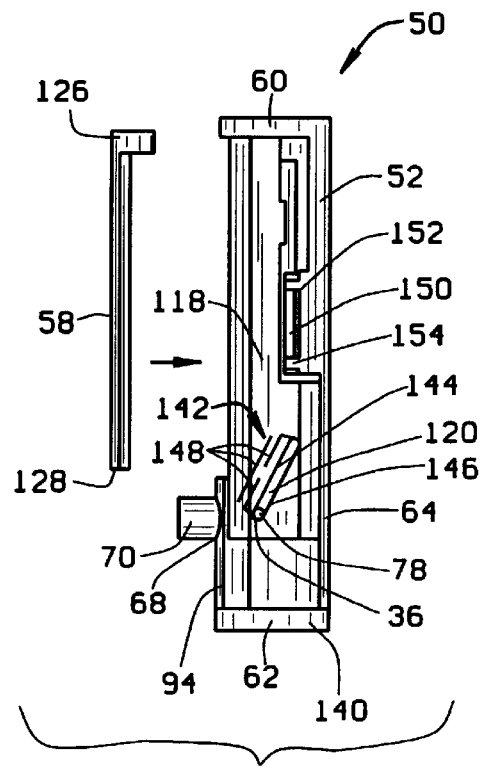
FIG. 4 is an exploded side view schematic illustration of the EDM tool shown in FIG. 1.

FIG. 3 is a front view schematic illustration of EDM tool 50 and FIG. 4 is an exploded side view schematic illustration of EDM tool 50. As more clearly shown in FIGS. 3 and 4, second end 62 of housing 52, includes a cap 140. In addition, and as shown in FIG. 4, cam 56 includes an integral spring 142. Spring 142 is adjacent cam slot 120 and exerts a bias force on slot 120. Particularly, cam slot 120 includes opposite first and second sides 144 and 146, respectively. Spring 142 exerts a force on first side 144 of slot 120 so that first side 144 is biased toward second side 146 and couples first end 136 of electrode pin 78 to each side 144 and 146 of slot. Accordingly, spring 142 is configured to maintain electrode pin 78 in physical contact with cam 56. Spring 142, in accordance with one embodiment, is integral with cam 56 and is formed by several slots 148 in cam leg 118 adjacent slot 120. Cam 56 includes a second integral second spring (not shown) adjacent slot 124 in cam leg 122. The second spring is configured the same as first spring 142.

Housing 52, as shown in FIG. 4, includes a guide 150 extending from first wall 64 for guiding linear motion guide 54. Guide 150 includes a first end 152 and a second end 154 and extends from first wall 64 so that guide 150 is between first end 60 and second end 62 of housing 52. More specifically, guide 150 extends between first end 60 of housing 52 and upper end 84 of lower portion 80 of housing 52. Guide 150 is configured to align linear motion guide 54 and cam 56 within housing 52.

To assemble EDM tool 50, linear motion guide 54 is positioned in linear motion guide portion 90 of housing cavity 66 so that first end 102 of linear motion guide 54 is adjacent first end 60 of housing 52 and so that second end 104 of linear motion guide 54 is adjacent linear motion guide surface 86 of housing lower portion 80. Particularly, linear motion guide first end 102 abuts, i.e., is in physical contact with, housing first end 60 and linear motion guide second end 104 abuts linear motion guide surface 86. In addition, linear motion guide 54 is positioned so that linear motion guide 150 aligns support rail 98 substantially coaxially to housing 52.

Cam 56 is coupled to linear motion guide 54 so that cam 56 is slidably coupled to housing 52 and movable between housing first end 60 and housing second end 62. Particularly, cam 56 is coupled to linear motion guide bearing 100 and positioned so that cam lower portion 80 extends between cam legs 112 and 116 and so that at least a portion of each cam leg slot 120 and 124 is substantially aligned with housing pin slot 72A and 72B, respectively.

Support member 58 is coupled to housing 52 so that cam 56 and linear motion guide 54 are between support member 58 and first wall 64 of housing 52. Particularly, support member 58 is positioned in support member portion 92 of housing cavity 66 so that first end 126 of support member 58 is adjacent housing first end 60 and second end 128 of support member is adjacent support member surface 88 of housing lower portion. More particularly, support member first end 126 abuts housing first end 66 and support member second end 128 abuts support member surface 88.

Electrode 70 is positioned in electrode bore 68 so that electrode pin bore 76 is substantially aligned with housing pin slots 72A and 72B and cam leg slots 120 and 124. Electrode pin 78 extends through electrode pin bore 76 so that first end 136 of electrode pin 78 extends through housing pin slot 72A and cam leg slot 120 and second end 138 of electrode pin 78 extends through housing pin slot 72B and cam leg slot 124. Electrode pin first end 136 is in physical contact with cam leg 118 and electrode pin second end 138 is in physical contact with cam leg 122.

Figure 5:
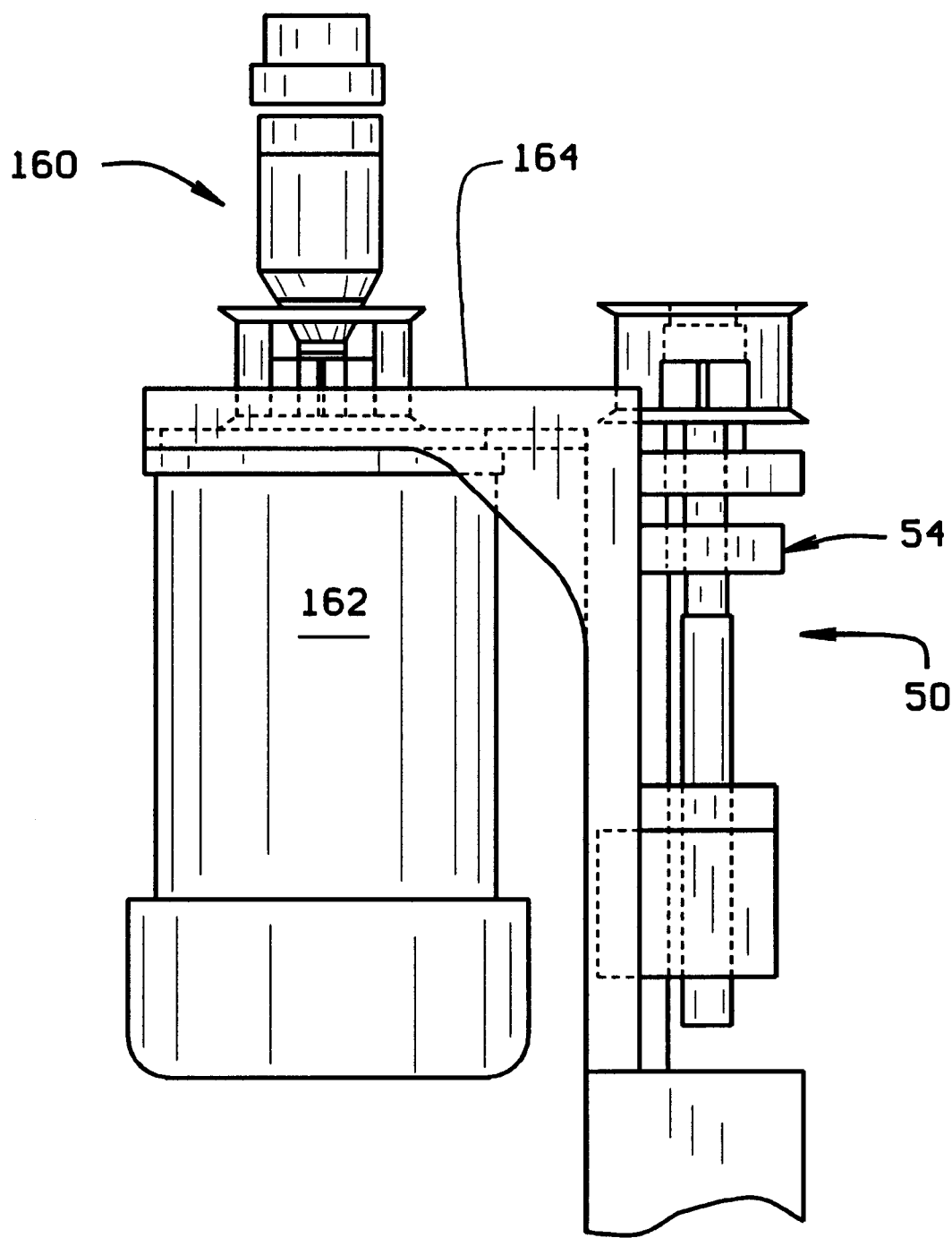
FIG. 5 is a schematic illustration of the EDM tool shown in FIG. 1 and a drive assembly in accordance with one embodiment of the present invention.

FIG. 5 is a schematic illustration of EDM tool 50 and a drive assembly 160 in accordance with one embodiment of the present invention. Drive assembly 160 is coupled to EDM tool 50 and configured to drive linear motion guide 54. Particularly, drive assembly 160 is configured to drive bearing 100 along support rail 98 between first and second ends 102 and 104, respectively, of support rail 98. Drive assembly 160 also is configured to transmit electrical discharge machining (EDM) power to EDM tool 50 and electrode 70. Drive assembly 160 includes a drive motor 162 and is coupled to EDM tool 50, for example, with a cable 164. Alternatively, drive assembly 160 may include a motor and gear box (not shown). Drive motor 162 may, for example, be a stepper motor.

Figure 6:
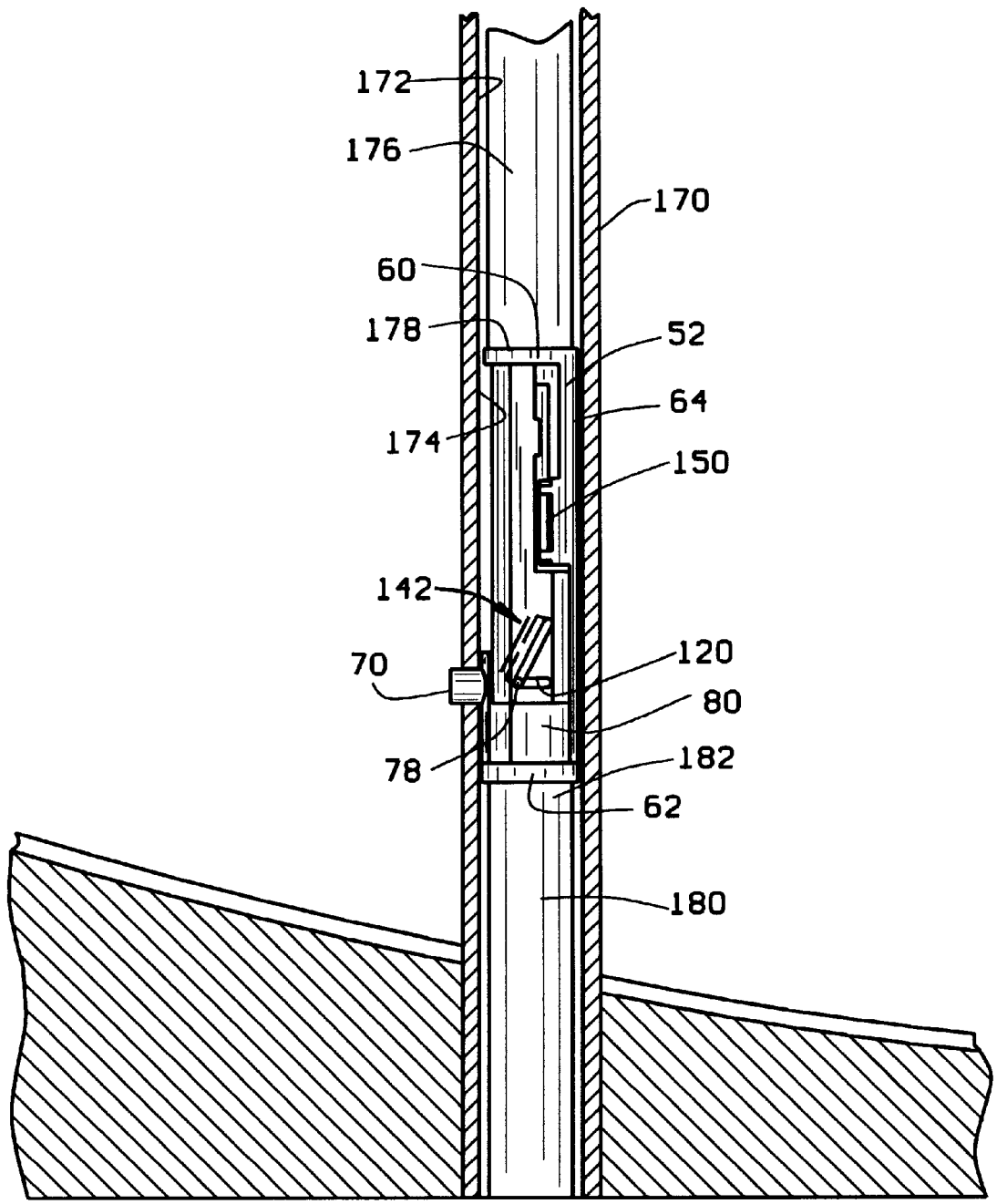
FIG. 6 is a side view schematic illustration of the EDM tool shown in FIG. 1 positioned in a pipe in accordance with one embodiment of the present invention.

FIG. 6 is a side view schematic illustration of EDM tool 50 positioned in a pipe 170 such as an in core monitor housing in accordance with one embodiment of the present invention. Pipe 170 is substantially cylindrical and includes a bore 172 extending therethrough. EDM tool 50 is positioned substantially concentrically and coaxially within pipe bore 170 so that an annulus 174 is formed between pipe 170 and EDM tool 50. Accordingly, electrode bore 70 is positioned so that a central axis of electrode bore 70 is substantially perpendicular to the center axis of pipe 170.

After positioning EDM tool 50 at a desired location, hydraulic pressure is applied to EDM tool 50 to stabilize tool 50 within pipe 70. Particularly, a first rod 176 extends within pipe bore 172 so that one end 178 of first rod 176 abuts first end 60 of housing 52. Similarly, a second rod 180 extends within pipe bore 172 and one end 182 of second rod 180 abuts second end 62 of housing 52. Hydraulic pressure is applied to housing 52 via first and second rods 176 and 180 to facilitate maintaining housing 52 substantially stationary within the rod bore.

Driving assembly 160 is activated to drive linear motion guide 54 and thus move cam 56 relative to housing 52. Particularly, drive motor 162 drives linear motion guide bearing 100 to move between respective first and second ends 102 and 104 of support rail 98. Drive assembly 160 may, for example, be positioned within the pipe bore adjacent EDM tool 50. Alternatively, drive assembly 180 may be positioned outside of the pipe bore.

As drive assembly 160 drives cam 56 along support rail 98, electrode pin 78 moves within cam leg slots 120 and 124 and electrode 70 moves relative to electrode bore 68. Particularly, and for example, as cam 56 moves in a first direction, e.g., toward housing first end 60, electrode pin 78 moves within cam leg slots 120 and 124 toward cam second end 108 and causes electrode 70 to extend from electrode bore 68. Similarly, as cam 56 moves in a second direction, i.e., toward housing second end 62, electrode pin 78 moves within cam leg slots 120 and 124 toward cam first end 106 and causes electrode 70 to retract into electrode bore 70. Accordingly, cam 56 converts substantially vertical movement of bearing 100 to substantially horizontal movement of electrode 70.

Driving assembly 160 also transmits EDM power to EDM tool 50 and electrode 70 via cable 164. Particularly, driving assembly 160 transmits EDM power to cam 56 which conducts such power to electrode 70. First and second ends 136 and 138 of electrode pin 78, as described above, are in physical connection with cam legs 118 and 122, respectively. Cam spring 142 exerts a bias force on first side 144 of each slot 120 and 124, respectively, so that first and second ends 136 and 138 of electrode pin 78 maintain physical contact with cam legs 118 and 122, respectively, even when cam 56 is moving. However, the bias force does not prevent first and second ends 136 and 138 of electrode pin 78 from moving within cam leg slots 120 and 124, respectively. Accordingly, EDM power supplied to cam 56 is conducted to electrode pin 78 via pin ends 136 and 138. Electrode pin 78 then conducts the EDM power to electrode 70, which uses such power to machine an opening through pipe 170. In accordance with one embodiment, housing 52 and support member 58 are electrically grounded.

To machine an opening in pipe 170, drive assembly 160 drives cam 54 in the first direction to extend electrode 70 from electrode bore 68 and position electrode 70 substantially adjacent the perimeter of the pipe bore. EDM power is transmitted cam 54 and to electrode 70 so that EDM tool 50 operates as an electrical discharge machine and so that electrode 70 machines an opening in pipe 170. As shown in FIG. 6, drive assembly 160 drives cam 56, and thus electrode 70, until electrode 70 extends through pipe 170. After machining pipe 170, drive assembly 160 drives cam 56 in the second direction to retract electrode 70 within housing electrode bore 68.

In accordance with one embodiment, any particulate created while machining pipe 170 is flushed from pipe 170 with water. Particularly, while machining pipe 170, water is pumped into pipe bore 172 so that water flows through annulus 174 between pipe 170 and EDM tool 50. The flowing water then thus flushes particulate from pipe 170.

The above-described EDM tool facilitates machining more easily than by utilizing known methods. Such assembly also is inexpensive to fabricate and easy to operate.

From the preceding description of the present invention, it is evident that the objects of the invention are attained. Although the invention has been described and illustrated in detail, it is to be clearly understood that the same is intended by way of illustration and example only and is not be taken by way of limitation. For example, the above-described cam moved substantially vertically within the housing. However, the cam may move in other directions. Similarly, while the above-described cam included an integral spring for substantially maintaining physical contact between the electrode pin and the cam, a separate spring may be used. Accordingly, the spirit and scope of the invention are to be limited only by the terms of the appended claims.

What is claimed is:

1. A tool for machining a pipe in a nuclear reactor, the pipe including a bore, said tool comprising:
   a housing sized to be positioned within the pipe bore, said housing comprising an electrode bore;
   a cam slidably coupled to said housing, said cam comprising a first slot therein;
   an electrode coupled to said cam and positioned within said electrode bore; and
   an electrode gin coupled to said electrode and extending at least partially through said first slot in said cam.

2. A tool in accordance with claim 1 further comprising a linear motion guide for moving said cam relative to said housing.

3. A tool in accordance with claim 1 wherein said housing comprises a cavity, and wherein said cam is positioned within said housing cavity.

4. A tool in accordance with claim 1 wherein said electrode pin physically contacts said cam.

5. A tool in accordance with claim 1 wherein said housing includes first and second slots in communication with said electrode bore, said first and second slots substantially aligned on opposite sides of said bore, and wherein said electrode pin extends through said electrode and through said first and second slots to slidably couple said electrode to said housing.

6. A tool in accordance with claim 1 further comprising a drive assembly coupled to said cam and configured to move cam relative to said housing.

7. A tool in accordance with claim 1 wherein said cam includes an integral spring.

8. A method for machining a pipe in a nuclear reactor with a tool, the pipe including a pipe bore, said method comprising the steps of:
   positioning the tool within the pipe bore; and
   machining an opening in the pipe from within the pipe bore utilizing the tool, wherein the tool includes a housing, a cam slidably coupled to the housing, an electrode coupled to said cam, and an electrode pin coupled to the electrode, the housing including an electrode bore sized to receive the electrode, the electrode positioned within the electrode bore, the cam comprising a first slot therein, and the electrode pin extending at least partially through the first slot in the cam.

9. A method in accordance with claim 8 wherein machining the opening in the pipe comprises the step of extending the electrode from the electrode bore.

10. A method in accordance with claim 9 wherein machining the opening in the pipe comprises the steps of extending the electrode from the electrode bore so that it abuts the pipe and providing electrical discharge machining power to the extended electrode.

11. A method in accordance with claim 8 wherein machining the opening in the pipe comprises positioning the electrode adjacent the pipe and providing electrical discharge machining power to the electrode.

12. A method in accordance with claim 11 further comprising the step of moving the cam.

13. A method in accordance with claim 8 wherein positioning the tool within the pipe bore comprises the step of stabilizing the housing relative to the pipe.

14. A method in accordance with claim 13 wherein hydraulic pressure is used to stabilize the housing.

15. A method in accordance with claim 8 wherein the tool is positioned in the pipe bore so that an annulus is formed between the tool and the pipe, and wherein said method further comprises the step of pumping water through the annulus.

16. A tool for machining a pipe having a bore, said tool comprising:
   a housing sized to be positioned within the pipe bore, said housing comprising an electrode bore;
   a cam slidably coupled to said housing, said cam comprising a first slot therein;
   an electrode coupled to said cam and positioned within said electrode bore;
   an electrode pin coupled to said electrode and extending at least partially through said first slot in said cam; and
   a linear motion guide for moving said cam relative to said housing.

17. A tool in accordance with claim 16 wherein said housing comprises a cavity, and wherein said cam is positioned within said housing cavity, said housing including first and second slots in communication with said electrode bore, said first and second slots substantially aligned on opposite sides of said bore, and wherein an electrode pin extends through said electrode and through said first and second slots to slidably couple said electrode to said housing.

* * * * *